United States Patent [19]
Gerein

[11] Patent Number: 5,855,245
[45] Date of Patent: Jan. 5, 1999

[54] DISK OPENER CARRIER HITCH

[75] Inventor: Mark Anthony Gerein, Saskatchewan, Canada

[73] Assignee: Flexi-Coil Ltd., Saskatoon, Canada

[21] Appl. No.: 734,189

[22] Filed: Oct. 21, 1996

[51] Int. Cl.⁶ .................................................. A01B 63/22
[52] U.S. Cl. ............................................ 172/328; 172/677
[58] Field of Search ................................ 172/327, 328, 172/400, 413, 448, 449, 396, 417, 274; 280/414.5, 438.1, 481

[56] References Cited

U.S. PATENT DOCUMENTS

| | | | |
|---|---|---|---|
| 2,686,648 | 8/1954 | Oehler | 172/272 X |
| 3,912,018 | 10/1975 | Brundage et al. | 172/328 |
| 4,326,594 | 4/1982 | Oka et al. | 172/328 |
| 4,373,591 | 2/1983 | Schaaf et al. | 172/328 |
| 4,428,435 | 1/1984 | Hubbard et al. | 172/328 |

*Primary Examiner*—Michael J. Carone
*Assistant Examiner*—Robert Pezzuto
*Attorney, Agent, or Firm*—Anthony Asquith & Co.

[57] ABSTRACT

A floating hitch for an agricultural implement has a hydraulic ram arranged for locking the implement in a raised position relative to the hitch, for transport. For transport, the ram extends into abutment with a point on the implement, and retracts out of the abutment for operation. A floating link guides the end of the ram, and the arc of movement of the floating link is such that the link lies normal to the ram axis at the point of abutment contact.

7 Claims, 4 Drawing Sheets

DISK OPENER CARRIER HITCH

DESCRIPTION OF THE PREFERRED EMBODIMENT

Figure 1:
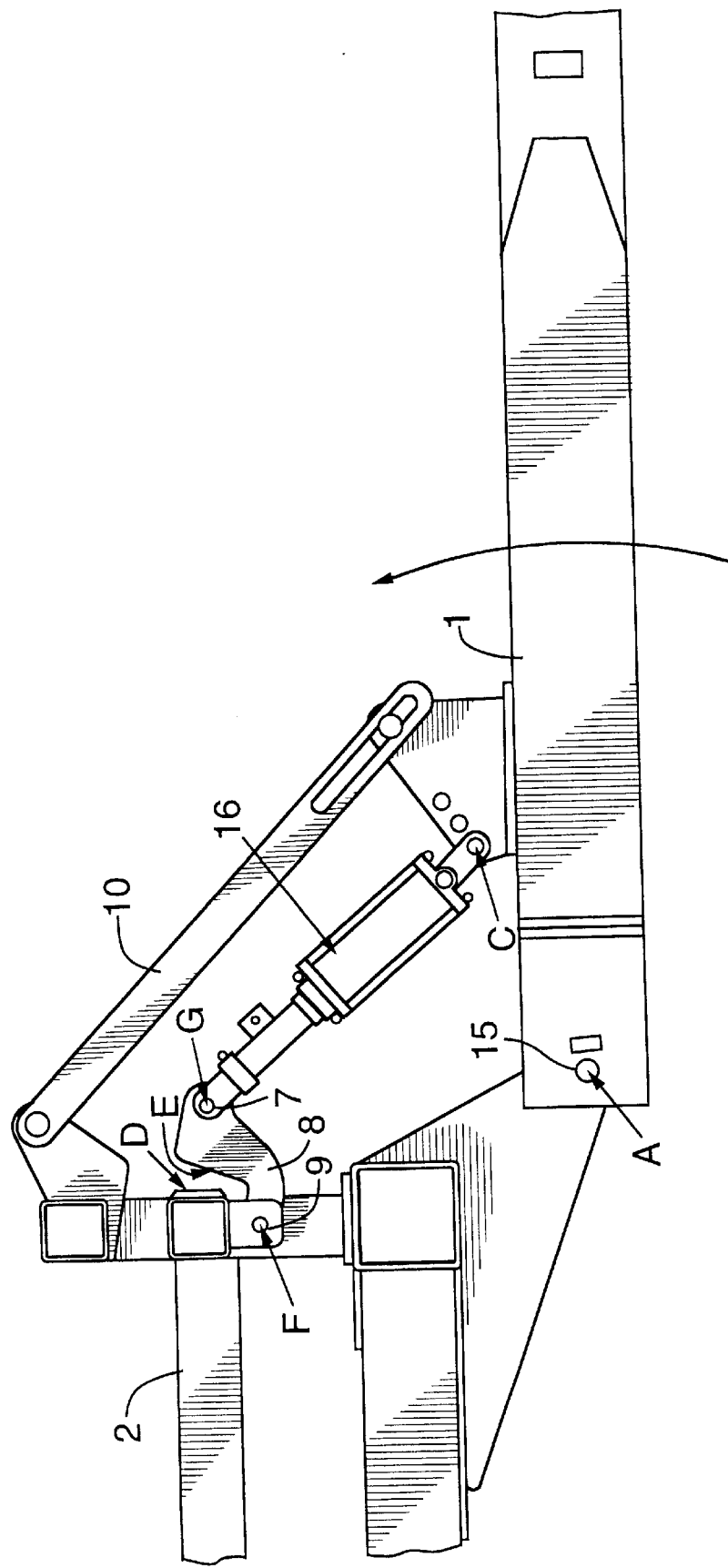
FIG. 1 is a cross-section of the hitch shown in working condition.

FIG. 1 shows the locking hitch generally designated 14 in working condition. The direction of travel is indicated at 13.

Figure 2:
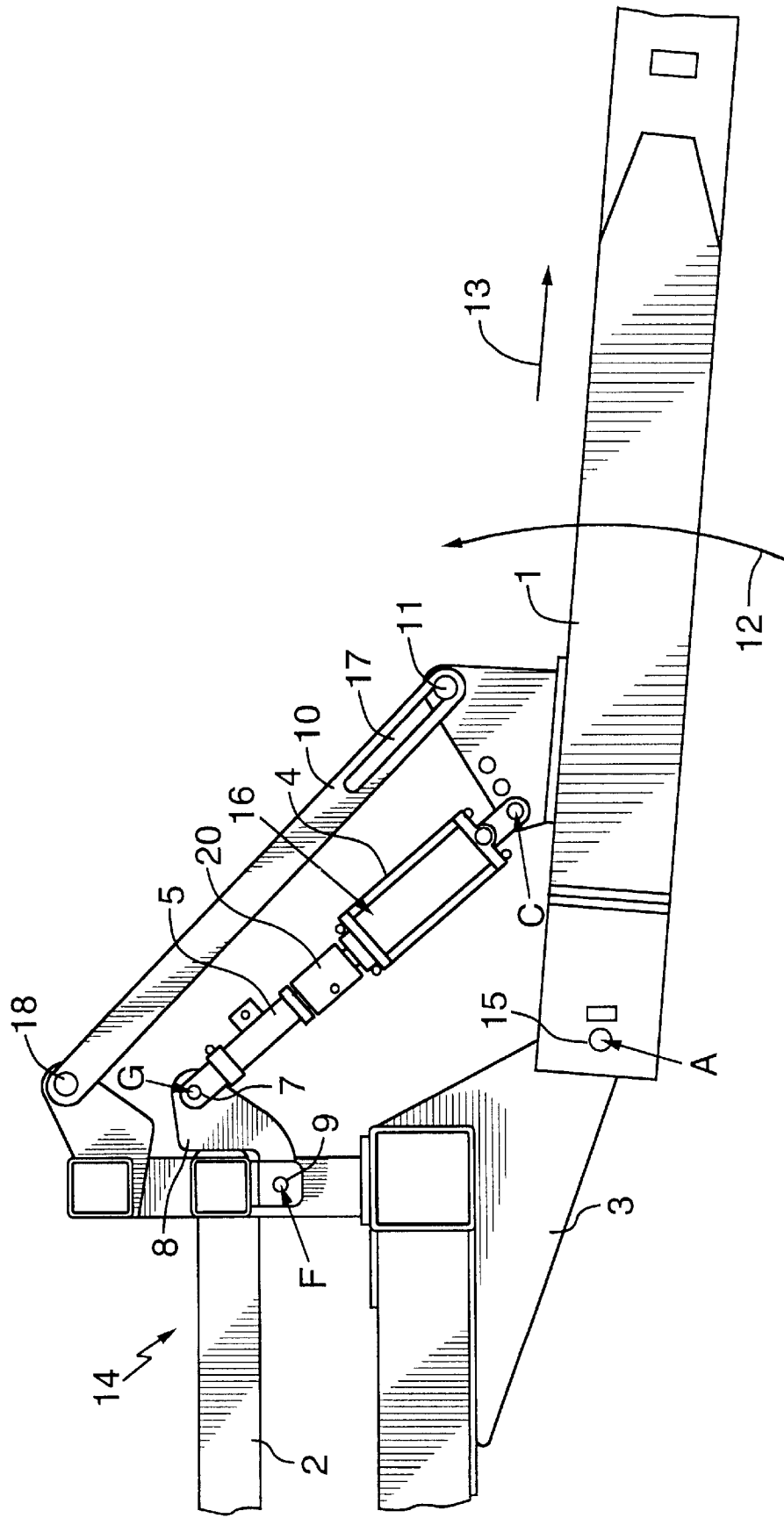
FIG. 2 is a cross-section of the hitch shown in transport and locked condition.
Figure 3:
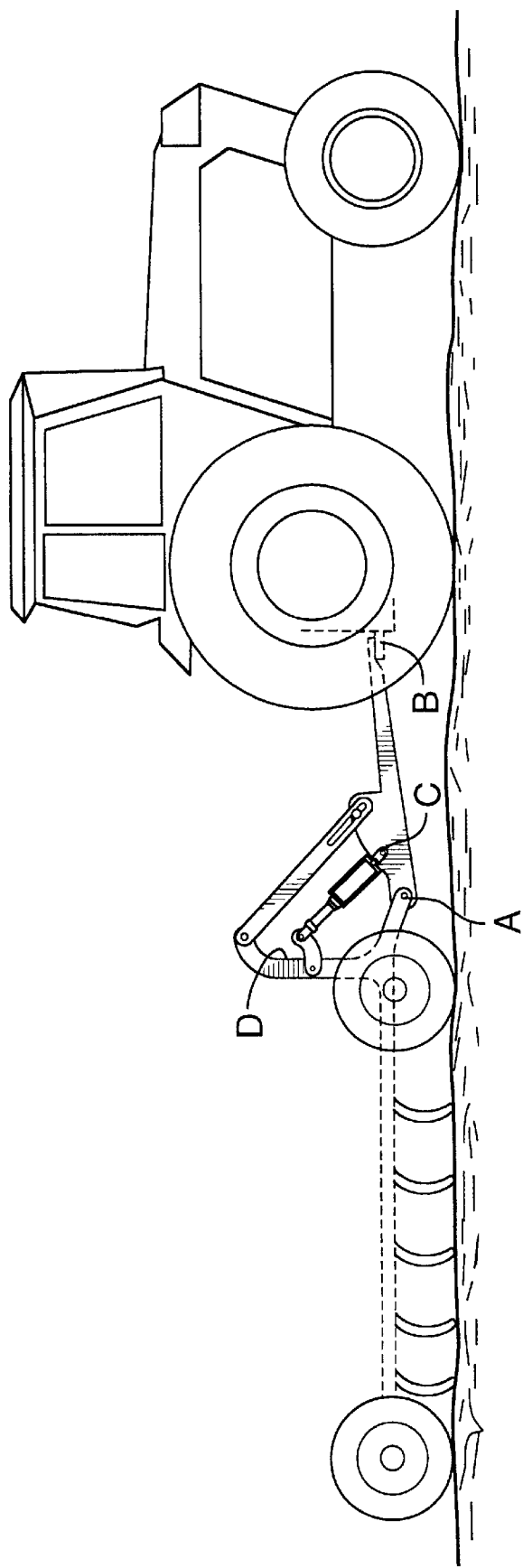
FIG. 3 shows a plan view of the hitch of the invention in conjunction with a conventional tractor and implement frame, the components being shown in a working condition.

FIG. 2 shows the locking hitch in locked position for transport.

Hitch 1 may be attached to a tractor 19 or other implement such as an air seeder in a conventional manner. Hitch 1 is secured to the fixed extension 3 of tool frame 2 for pivotal movement about transverse axis 15 providing a floating hitch for the tool frame 2 in a conventional manner.

Preferably barrel end 4 of the hydraulic ram 16 is mounted directly to hitch portion 1 for pivotal movement at connection 6. Rod end 5 of the hydraulic ram 16 is pivotally attached at 7 to floating link 8. Link 8 is pivotally attached to frame 2 at 9.

Alternatively, the hydraulic ram and floating link may be reversed with the barrel end attached to the frame.

During working of the implement, ram 16 provides for rotation of floating link 8 at 7 and 9 and the hitch 1 floats by rotation at 15 in the direction shown at 12. Preferably, no pressure is applied to ram 16 and the hitch floats freely, during working.

For transport, pressure is applied to ram 16 and causes extension of rod 5 which, in turn, causes rotation of link 8 at 9 until abutment 8 contacts the frame 2. Further extension of ram 16 causes rotation of hitch 1 about 15. Preferably the rotation is limited by the length of the stroke of the ram 16.

The hitch is also provided with locking arm 10 which is pivotally attached to the frame 2 at 18 and includes a slot 17 for sliding engagement with pin 11 mounted to hitch 1. Locking arm may be configured to limit the extension of ram 16 and lock out any floating action of hitch 1 in respect of frame 2 during transport of the implement. Alternatively, slot 17 may be slightly longer, or may be omitted, so as to permit the full extension of ram 16 to the end of its stroke, i.e so that the ram bottoms out at the end of its stroke.

Preferably rod 5 is provided with a transport lock (not shown) to mechanically prevent retraction of rod 5 during transport for safety reasons in the event the hydraulic pressure should fall.

Figure 4:
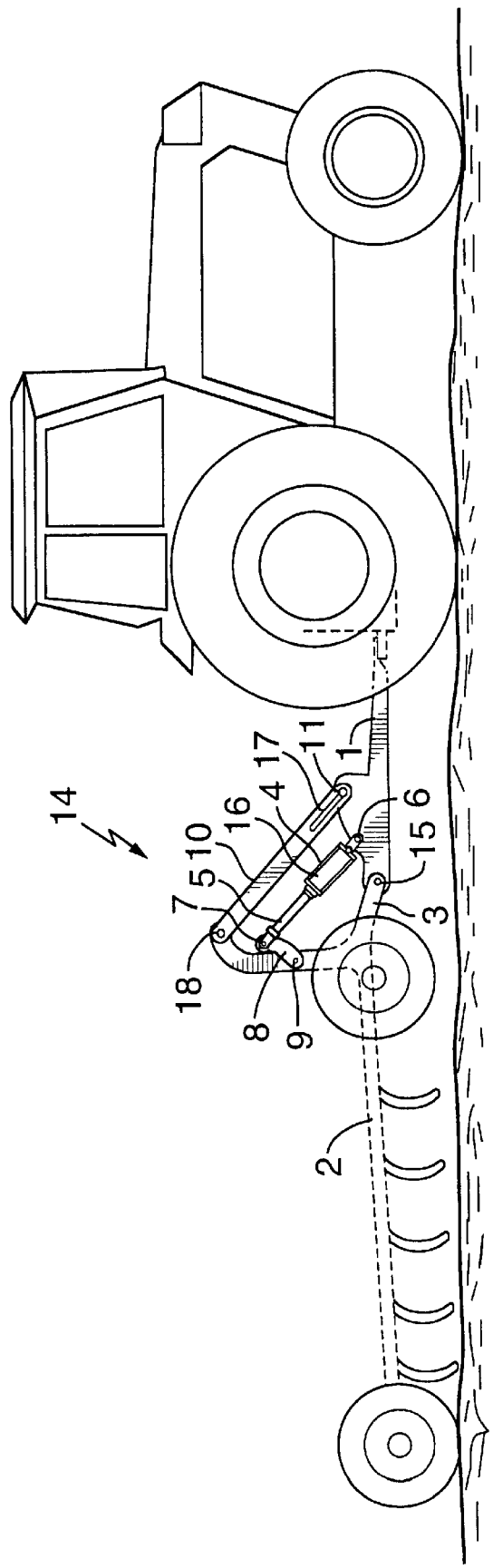
FIG. 4 is the same view as FIG. 3, the components being shown in the transport condition.

In FIG. 4, the hydraulic ram has been actuated, i.e extended, whereby the frame can no longer pivot relative to the hitch about point 15. The front wheels of the trailer have been (at least partially) lifted off the ground, whereby the weight of the front end of the frame now rests on the tractor. Thus, during towing of the implement for transport (non-working) purposes the hitch is solid, whereas during working operation the hitch is floating.

The way in which the floating link is configured geometrically is important in the invention. The main pivot about which the implement pitch-pivots during normal operation is pivot A (which is at 15 in the structure depicted in the drawings). The floating link and the ram together comprise a mechanical link, which extends between point C on the hitch member, and point D on the implement. The end E of the mechanical link is retracted out of contact with the point D (for normal operation of the implement), and when the mechanical link is so retracted, the end E and the ram are supported by the floating link. The floating link has a radius from its pivot point F, to its point of pivot connection G with the ram, termed the F-G radius.

As shown in FIG. 2, when the point E on the mechanical link is in abutting contact with the point D on the implement, the F-G radius of the floating arm lies at right angles to the axis of the ram. Thus, none of the force of the ram is transmitted to, nor is felt by, the floating arm, whereby all the force of the ram is available for pressing the points D and E together, i.e for raising the implement.

On the floating arm, the radius from the pivot F to the point of contact between D and E is less than the radius from the pivot F to the ram axis. Therefore, the D-E contact force is leveraged upwards from the ram force. Thus, the force in the ram needed to lift the implement is low, and none of it is wasted, which enables the components to be designed to cater for low stresses.

The ram is adjustable as to its distance from the pivot A, by moving the bottom end of the ram to one of the other holes illustrated near point C.

I claim:

1. A hitching apparatus for an agricultural implement, wherein:

the apparatus includes an elongate hitch member;

the apparatus includes a pitch-mode pivot connection A between the hitch member and an implement member;

the pivot connection A is such that, in operation of the apparatus, the implement can pitch-pivot relative to the hitch member about the pivot connection A, whereby, during pivoting, the distance L from a point C on one of the members to a point D on the other of the members, being points spaced from pivot A, varies in length;

when the tractor and the hitched trailer are on flat level ground, the distance between points C and D is L0;

the apparatus includes a first mechanical link, which is operative between point C and point D;

the first mechanical link includes a hydraulic ram, and the link is variable in length as the ram is operatively extended and retracted;

the first mechanical link includes a fixed-connection means at one end of the link, at which the link is pivotally fixed to point C, and includes a floating-connection means at the other end E of the link;

the structure of the first mechanical link and of the floating connection means is such that the said other end E of the link is movable into a transport-position, in which the ram is extended and the link makes forceful abutment with point D, and into a working-position, in which the ram is retracted and the end E of the link is clear of abutment with point D;

the floating connection means includes a floating guide link, for guiding and constraining the end E of the first mechanical link into and out of abutment with the point D;

a point on the floating guide link is pivotally fixed to a point F on the said other member, being the member on which lies point D;

a second point on the floating guide link is pivotally fixed to a point G on the first mechanical link;

the arrangement of the floating link is such that the point G on the floating link moves in an arc about the point F when the ram is extended and retracted, an F-G radius of the link being the radius between point F and point G;

the geometrical arrangement of the floating link, and of its arc of movement, is such that, when the ram is extended so far that the end E of the mechanical link makes forceful abutment with the point D, the F-G radius of the floating link lies substantially perpendicular with respect to the axis of the ram;

the apparatus includes a ram travel-limit-means;

the ram is extendable in length, upon being supplied with hydraulic pressure, up to a limit of extension;

the limit of extension is defined by the ram travel-limit-means;

the ram is of such dimensions that, at its limit of extension, the distance between points C and D is greater than L0.

2. Apparatus of claim 1, wherein the point F lies on the said other member between point A and point D, and lies spaced from point A and point D.

3. Apparatus of claim 1, wherein:

the floating link includes a point of contact thereon, being a point at which the end E of the mechanical link makes abutting contact with the point D on the said other member;

the distance between the said point of contact and the point F is smaller than the distance between point F and point G;

whereby, for a given abutment force between E and F, the force in the ram is less.

4. Apparatus of claim 1, wherein:

the floating link includes a point of contact thereon, being a point at which the end E of the mechanical link makes abutting contact with the point D on the said other member;

the distance between the said point of contact and the point F is smaller than the radial distance from point F to the axis of the ram;

whereby, for a given abutment force between E and F, the force in the ram is less.

5. Apparatus of claim 1, wherein the ram is adjustable as to the radial distance of its axis from pivot A.

6. Apparatus of claim 1, wherein the ram travel limit means is a means for limiting the extension of the ram, external to, and separately from, the piston bottoming in the cylinder of the ram.

7. Apparatus of claim 1, wherein the ram travel limit means comprises the piston bottoming in the cylinder of the ram.

* * * * *